No. 870,212. PATENTED NOV. 5, 1907.
A. E. ALDRED.
APPARATUS FOR ELEVATING AND HANDING UP DOUGH.
APPLICATION FILED APR. 12, 1907.

WITNESSES

INVENTOR.
Alfred E. Aldred
BY
ATTORNEYS

UNITED STATES PATENT OFFICE.

ALFRED E. ALDRED, OF GLENCOE, ONTARIO, CANADA.

APPARATUS FOR ELEVATING AND HANDING UP DOUGH.

No. 870,212.    Specification of Letters Patent.    Patented Nov. 5, 1907.

Application filed April 12, 1907. Serial No. 367,742.

*To all whom it may concern:*

Be it known that I, ALFRED E. ALDRED, of the town of Glencoe, in the Province of Ontario, Canada, have invented certain new and useful Improvements in Apparatus for Elevating and Handing up Dough, of which the following is a specification.

My object is to devise apparatus which will elevate dough from one machine to another and will at the same time subject it to the peculiar rolling and turning process known as "handing up". For this purpose I employ a V-shaped trough of suitable inclination for the degree of elevation required having one side formed by a traveling band or canvas, and provided with a pressure bar which holds the dough down in the angle of the V.

Figure 1:
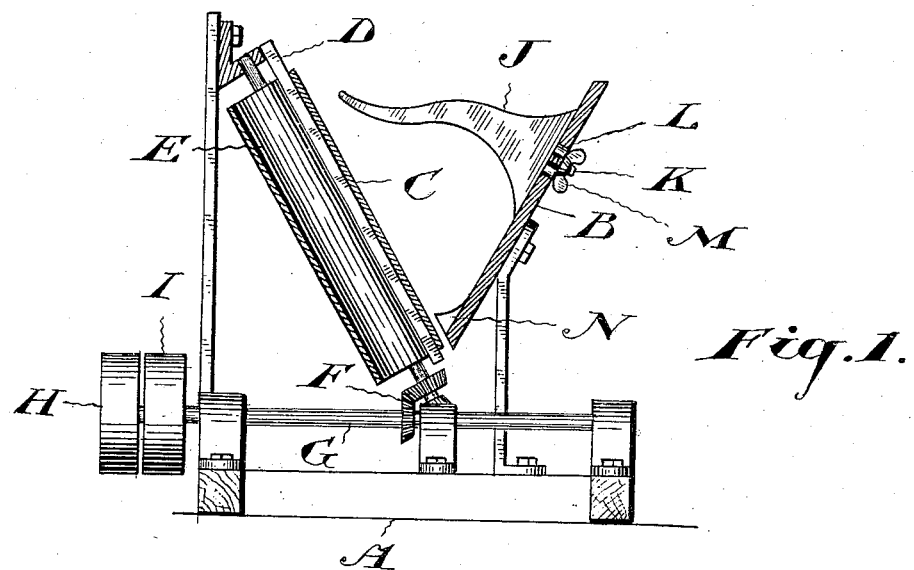
Figure 2:
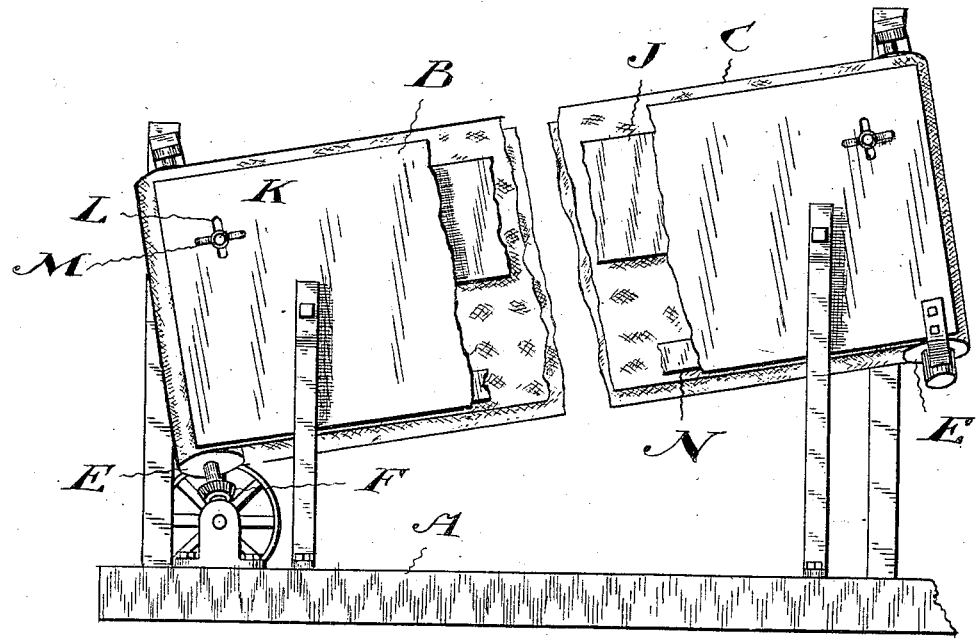

Figure 1 is a cross section of my improved apparatus. Fig. 2 is a side elevation of the same, partly broken away and partly in section.

In the drawings like letters of reference indicate corresponding parts in the different figures.

A is the frame of the apparatus, which may be of any suitable construction to support the different parts. On this frame is supported a V-shaped trough, the angle of the V being downward. This trough may have any desired inclination from its lower to its upper end, depending upon the height to which the dough is to be lifted. One side B of the trough is fixed while the other side is formed by a traveling band or canvas C, which is supported by the backing D. This canvas runs on a roller E at each end of the trough, the spindles of the rollers being journaled in suitable boxes supported by the frame A. One of the rollers is geared by bevel gearing F to the shaft G journaled on the frame A, and provided with suitable driving means, such as the fast and loose pulleys H and I. An upward movement longitudinal of the trough may thus be imparted to the canvas C.

The dough is held down in the trough by means of the pressure bar J, which is suitably supported above the lower angle of the V. This bar is preferably thus held by being adjustably secured to the fixed side B. For this purpose I provide bolts K extending out from the pressure bar through slots L formed in the fixed side B. Butterfly nuts M on the bolts K provide means whereby the pressure bar may be clamped and adjusted. This pressure bar is preferably concave in cross section on its under side, as shown.

A filling piece N, preferably concave in cross section on its upper side, is secured to the lower edge of the fixed side B to fill out the lower angle of the V.

A trough with two inclined sides and two rounded corners is thus provided through which the dough is rolled by the movement of the traveling band and up which it is elevated. The pressure bar holds the dough down in this V-shaped trough, and the canvas surface lying in a plane inclined from the perpendicular plane passing through the axis of the trough necessarily tends to work the dough up the trough while the contact with the opposite inclined fixed side has a retarding tendency on the other side of the dough so that a rolling action necessarily accompanies the upward movement of the dough.

What I claim as my invention is:

1. Dough elevating and handing up mechanism, comprising a substantially V-shaped inclined trough having one side formed by a traveling band having the plane of its surface inclined from the vertical plane passing through the axis of the trough.

2. Dough elevating and handing up mechanism, comprising a substantially V-shaped inclined trough having one side formed by a traveling band having the plane of its surface inclined from the vertical plane passing through the axis of the trough; and a pressure bar located above the lower angle of the V.

3. Dough elevating and handing up mechanism, comprising a substantially V-shaped inclined trough having one side formed by a traveling band having the plane of its surface inclined from the vertical plane passing through the axis of the trough; and a pressure bar located above the lower angle of the V, and adjustable to and from the same.

4. Dough elevating and handing up mechanism, comprising a substantially V-shaped inclined trough having one side formed by a traveling band having the plane of its surface inclined from the vertical plane passing through the axis of the trough; and a pressure bar located above the lower angle of the V, and concave in cross section on its under side.

5. Dough elevating and handing up mechanism, comprising a substantially V-shaped inclined trough having one side formed by a traveling band having the plane of its surface inclined from the vertical plane passing through the axis of the trough; a pressure bar located above the lower angle of the V; and a filling piece in the lower angle of the V.

6. Dough elevating and handling mechanism, comprising an inclined closed trough; an endless band conveyer running through the trough from end to end and having the plane of its surface inclined from the perpendicular plane passing through the axis of the trough; and a backing for the band.

Glencoe, Ont., eighth April, 1907.

ALFRED E. ALDRED.

In the presence of—
W. D. MOSS,
ETHEL SIMPSON.